Nov. 23, 1965          J. C. NORTON          3,218,709

CABLE SHEATH CUTTING DEVICE

Filed April 4, 1963          2 Sheets-Sheet 1

INVENTOR.
JOSEPH C. NORTON

BY *Maurice W. Ryan*

ATTORNEY

Nov. 23, 1965  J. C. NORTON  3,218,709
CABLE SHEATH CUTTING DEVICE
Filed April 4, 1963  2 Sheets-Sheet 2

INVENTOR.
JOSEPH C. NORTON
BY Maurice W. Ryan
ATTORNEY

United States Patent Office 3,218,709
Patented Nov. 23, 1965

3,218,709
CABLE SHEATH CUTTING DEVICE
Joseph C. Norton, Charleston, W. Va., assignor to Union Carbide Corporation, a corporation of New York
Filed Apr. 4, 1963, Ser. No. 270,726
6 Claims. (Cl. 30—91)

The present invention relates to a cable pencilling device for use as a tool in removing outer sheaths and beveling outer sheaths and insulation coverings on electrical conductors in preparation for conductor splicing and terminating operations. Apparatus according to the present invention is characterized by its simplicity, ruggedness and ease of operation and said apparatus provides means for increasing safety and saving time and labor in electric cable work.

This application is a continuation-in-part of my copending application Serial No. 188,725, filed April 19, 1962 which has matured into Patent No. 3,089,237 granted May 14, 1963, and relates particularly to a flexible strap embodiment of apparatus according to my invention as will be hereinafter described in detail and to embodiments adapted to spiral cutting of cable coverings as will also be described.

Electrical transmission, distribution and utilization circuits in public utility, industrial and commercial power systems comprise many miles of insulated power cables and involve myriad conductor splicing and terminating operations on a continual basis. Power cable splicing and terminating techniques are of great importance in any electrical system but become critically important where 5000 volt insulation and upward is involved. In systems which include such cables, it is acknowledged in industry that only skilled journeymen splicers are qualified to perform cable splicing and terminating operations. Dielectric stresses which occur at splicing and terminating points in insulated cable systems of medium and high voltage installations require not only careful handling of the splicing materials used but extraordinary care in preparation of the cables to be joined or terminated. Outer cable jackets and sheaths must be removed without damaging substrata layers in the cable such as shielding tapes or insulation and the insulation itself must be carefully beveled from its outer periphery to the conductor surface without damaging the conductor strands or any layers other than main insulation such as semiconducting tapes and the like which may surround the conductor. Prior to the time of my invention such preparatory work has, in the field at least, been performed by hand with relatively basic tools in a manner dependent solely upon the skill of the splicer performing the work. Not infrequently, dielectric tests performed on splices and terminations completed by skilled craftsmen reveal faults which render the work unusable and necessitate repeating the operation.

The present invention comprehends a novel device which obviates the major cause of splice faults, that is inaccurate beveling of the cable insulation and jacket layers, and provides a means whereby a relatively unskilled operator can produce cable splices and terminations of high quality hitherto attainable by only specially trained splicers.

With the foregoing and other features in view which shall hereinafter more fully appear, the present invention comprises novel constructions, combinations and arrangements of components as will now be described in greater particularity and as defined in the appended claims and illustrated in the appended drawings wherein:

Figure 1:
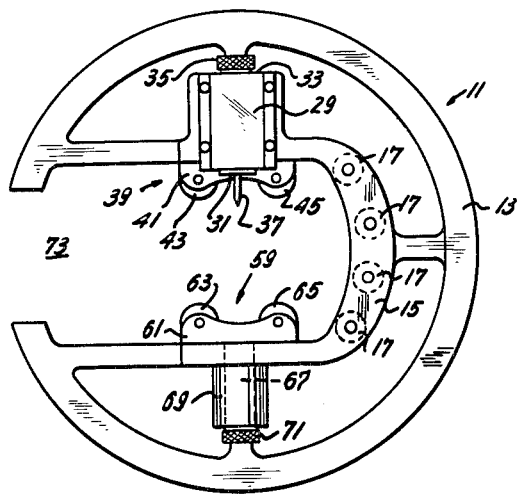
FIGURE 1 is a front view of an emboidment of apparatus according to the present invention.
Figure 2:
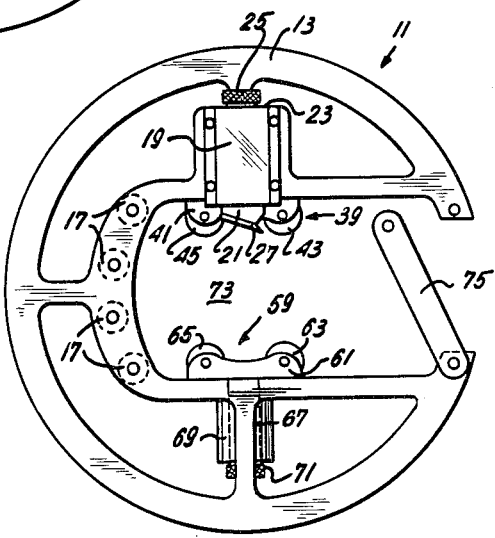
FIGURE 2 is a rear view of the apparatus with a detail of a keeper element added.
Figure 3:
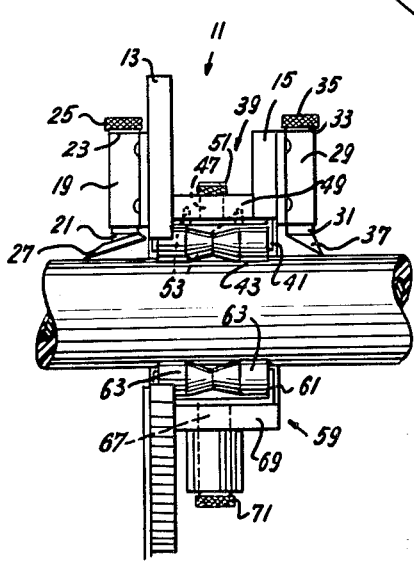
FIGURE 3 is a side elevation of the apparatus of FIGURES 1 and 2, shown in place on a section of insulated cable which is to be prepared for splicing.

In the drawing FIGURES 1, 2 and 3 there is shown a cable sheath cutter apparatus according to the present invention indicated generally as 11, comprising a main frame 13 and a secondary frame 15 held in fixed parallel spaced relationship with respect to each other by a multiplicity of spacers 17.

A first blade assembly carriage 19 is affixed to the main frame 13. Carriage 19 has a rectangular, preferably square, cross sectional interior extending part way therethrough, into which is fitted a rectangular, preferably square, cross sectioned beveling blade holder 21 to which there is longitudinally attached a threaded stud piece which extends through a hole in an end wall 23 of carriage 19. A knurled adjusting nut 25 engages the threads on the stud piece and permits cutting depth adjustment radially of a beveling blade 27 which is attached to the radially inner end of the blade holder 21. The adjusting nut 25 is held radially fixed but rotationally free with respect to the carriage 19 by any suitable mechanical expedient such as for example an enlarged diameter inner end, or a peripheral groove engaging end wall 23.

A second blade assembly carriage 29 is affixed to the secondary frame 15 and carries components similar to those associated with the carriage 19, comprising a rectangular, preferably square, cross sectioned cutting blade holder 31 which includes a threaded stud, fitted into a rectangular, preferably square, cross sectional interior of the carriage 29 with the stud extending through an end wall 33. The stud on the holder 31 threadedly engages a knurled adjusting nut 35 which may be held to carriage 29 in the same manner as adjusting nut 25 is held to carriage 19. A cutting blade 37 is attached to the radially inner end of the cutting blade holder 31.

A first roller assembly 39 is mounted between the main and secondary frames and comprises a roller journal 41 holding two rollers 43 and 45. A threaded stud 47 is attached to the back of journal 41 as are several registering pins 53. The threaded stud 47 is fitted through a hole in a roller assembly carriage 49 and a knurled locking nut 51 is threadedly engaged on the stud and drawn up tight until the pins 53 are engaged in registering holes in the carriage 49.

A second roller assembly 59 is also arranged between the main and secondary frames, disposed diametrically opposite the first roller assembly 39, and comprises a roller journal 61 holding rollers 63 and 65. A threaded stud 67 is attached to the back of journal 61 and extends through a hole in a roller assembly carriage 69. A knurled adjusting nut 71 engages threaded stud 67 and permits radial adjustment of the rollers and journal against a cable to be worked. The assembly comprising the rollers 63, 65, the journal 61, stud 67 and adjusting nut 71 can move rotatably within the roller assembly carriage 69 and may readily assume either the position shown in the drawings, whereby the rollers will follow the cable peripheral surface circumferentially, or a position at 90° from that shown, whereby the rollers will follow the cable surface longitudinally. Which of these two positions is assumed by the second roller assembly depends upon the position selected for the first roller assembly 39.

The pins 53 and related holes of the first roller assembly 39 are registerable in either of two positions, one of these being in accordance with the drawings. In the position shown in the drawings the rollers 43, 45 will follow the cable peripheral surface circumferentially. If the locking nut 51 is loosened the roller assembly 39 may be rotated 90°. The pins 53 will also register in holes in carriage 49 in this new position and the locking nut can be retightened. Rollers 43 and 45 will then be positioned to move along the cable longitudinally. As noted above, the assembly including the rollers 63 and 65 will automatically rotate 90° and follow the disposition of the first roller assembly 39. In order to provide accurate tracking along the cable length when the rollers 43, 45, 63 and 65 are disposed to traverse the cable longitudinally, each of the rollers is devised with a depressed center section, as shown in the drawings.

The frames 13 and 15 are made and assembled to define a cable opening 73. Once the cable sheath cutter 11 is in place with a cable in the opening 73, the opening may be closed by means of a keeper or latch 75 which is a safety feature to prevent the sheath cutter from falling from the cable should an operator lose his grip on it. Other means may be provided to accomplish this result such as for example a hinge arrangement in combination with a full circumference main frame 13. In any case, it will be readily appreciated that this type of safety feature is particularly advantageous in overhead line work.

To operate the embodiment of the invention described above, the cable sheath cutter 11 is placed over the cable to be worked at the point where the cable sheath is to be removed, the cable being arranged relatively in cable opening 73 to effect contact with the rollers 43 and 45 of first roller assembly 39. Knurled adjusting nut 71 is then turned until the rollers 63 and 65 of the second roller assembly 59 bear against the cable peripheral surface. Cutting blade holder 31 is turned 90° in the second blade assembly carriage 29 from the position shown in the drawings in order to position the cutting blade 37 for circumferential cutting of the sheath. The knurled adjusting nut 35 is then turned until cutting blade 37 is pierced the sheath to its full depth. The operator may now rotate the entire penciller by grasping the perimeter portions of frame 13 and make a complete circumferential cut at the point where the sheath is to end. After the circumferential cut is completed, the locking nut 51 on the first roller assembly 39 is loosened and the journal 41 and rollers 43, 45 are turned 90°. Cutting blade holder 31 is returned to the position shown in the drawings for longitudinally slitting of the cable sheath. In this position, with the cutting blade 37 set for the correct depth of cut, the operator can grasp frame 13 and draw the sheath cutter longitudinally along the cable to slit the sheath for the desired length. The roller of the second roller assembly will automatically pivot through 90° and follow the disposition of the first roller assembly. If these operations are performed at a cable end, the sheath which has been circumferentially and longitudinally cut can now be removed. It will be obvious that if the sheath is to be removed at a point along a run of cable to make a tap connection, a second circumferential cut in the sheath will be required.

After sheath removal the sheath edge can be bevel cut with the beveling blade 27. This is accomplished by arranging the sheath cutter at the required point on the cable and manipulating the adjusting nut 25 until the beveling blade 27 is properly adjusted to produce the desired cut. The sheath cutter is again rotated and moved to put the beveling blade into cutting engagement with the sheath. Complete sheath beveling may be effected with single full rotation of the device in cutting position. This step can also be performed prior to sheath removal or in some instances, where not recommended in a particular splicing specification, omitted altogether.

Manual removal and cutting away of shielding tapes, if any, in the customary manner, will expose the cable insulation, which may then be bevel cut in the same manner as described hereinabove for the preparation of the sheath, longitudinally slit and removed. Alternatively, the cable insulation may be first circumferentially and longitudinally slit and removed and then beveled in the above described manner. It will also be apparent to persons familiar with the art that, with some cables, longitudinal insulation slitting will not be required after making the insulation bevel cut, since the insulation can be pulled off the cable end. Any additional tapes, such as of semiconducting butyl rubber and the like, which may surround the conductor, should then be removed manually to expose the length of conductor necessary.

An embodiment of apparatus according to my invention as illustrated in the drawings was used to prepare a 500 mcm. polyethylene insulated, polyethylene jacketed, shielded, 15 kv. power cable for a one-way splice. The entire preparatory operation for splicing took one third of the time required for manual preparation by a skilled splicer. In addition, the accuracy and neatness of the cutting, slitting and beveling far exceeded that which is normally achieved by a skilled splicer. The finished splice was tested in accordance with conventional standards for 15 kv. cable work and successfully passed all tests.

The apparatus described above may be modified by adapting spring retainer devices to the blade holders 21 and 31 and to the selectably adjustable first roller assembly 39. These portions could then be relocated in 90° step by pushing in on the projecting studs, twisting to the desired position and releasing.

Figure 4:
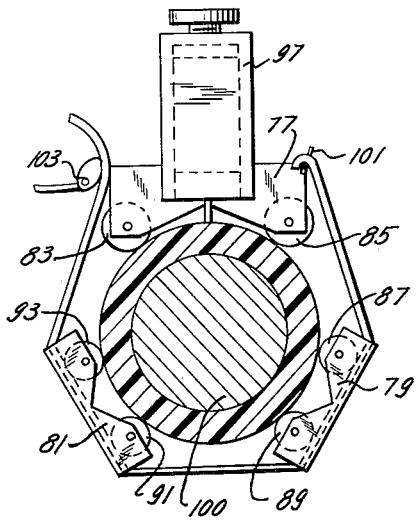
FIGURE 4 is a front view of an alternative embodiment of apparatus according to my invention and FIGURE 5 is a partially sectionalized side view of the FIGURE 4 embodiment.
Figure 5:
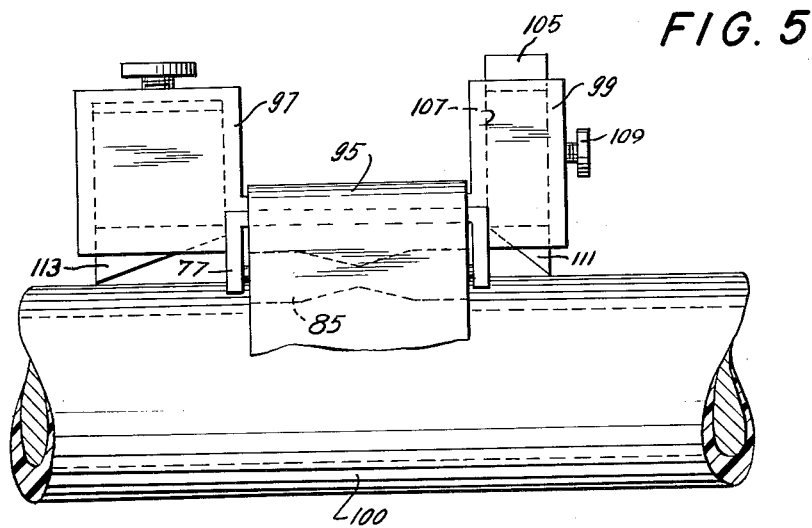

An alternative embodiment of apparatus according to my invention is shown in FIGURES 4 and 5 of the drawings. In this embodiment, a group of roller journals 77, 79, 81 mounting respectively roller pairs 83–85, 87–89 and 91—93 are secured in place around the periphery of a cable 100 by a flexible strap 95. One of the journals 77, may mount a beveling blade 113 and a cutting blade 111 respectively in blade assemblies 97 and 99 for beveling and slitting the cable coverings as required. While three roller journals are shown in the illustrated arrangement, and may in many instances be preferred in practice, two may be used without difficulty. The mechanics of the arrangement require that at least two roller journals be used, as persons skilled in the art will appreciate.

Flexible strap 95 may be secured to one of the journals 77 by means of a hook 101, passed through suitable recesses in the other journals and snubbed and held taut by a strap lock 103 on the opposite side of the journal it is hooked to.

The cutting blade assembly 99 may be designed to permit orienting the cutting blade 111 at an angle or within a range of selectable angles to the cable's longitudinal axis and thus, in operation, effect a spiral cutting action as the assembly is revolved about the cable's longitudinal axis. A polygon shaped blade holder 105 fitting a polygon socket 107 in the blade holder assembly carriage or a cylindrical blade holder in a cylindrical socket provided with a suitable set screw 109 can be adapted to effect this design. This arrangement and mode of operation will of course involve a simultaneous (with the revolving action) longitudinal advance of the assembly along the cable length. Here it should be noted that arranging the cutting blade 111 (or 37) to effect a spiral cut has also proven practical with the FIGURES 1, 2, 3 embodiment of apparatus according to my invention.

This aforedescribed flexible strap embodiment is adaptable to fit a greater range of cable sizes than the rigid frame models of the invention and is thus an excellent field tool. In operation, the longitudinal cutting or slitting of cable coverings may be performed by sliding the rollers endwise along the cable as well as by the method involving turning the rollers 90° to longitudinal traverse positions as per the rigid frame embodiment description.

The technique involving the spiral cutting with the cutting blade at some angle between 0° and 90° to the cable's longitudinal axis can be performed with the roller arranged in only one position, i.e. they need not be 90° rotatable to a longitudinal traverse position but can be worked on all steps in only the revolving position, sliding along the cable as required.

Apparatus according to the present invention provides a particularly useful tool in splice preparation work on lead sheathed cable and on the new thermoplastic insulation (such as polyethylene) and sheaths which are extremely difficult to cut with elementary cutting tools such as hand knives and the like. A single sheath cutter according to a rigid frame embodiment of my invention will cover a range of cable sizes and two or perhaps three different sized sheath cutters can cover the entire conventional power cable size range.

A considerably wider range of cable sizes can be covered by the flexible strap embodiment.

By the appropriate application of insulation, the apparatus of this invention can be readily adapted for use on energized power cables.

From the foregoing description and the appended drawings, it will now be apparent to persons familiar with the electric power cable art that I have provided a unique apparatus for preparing power cable for splicing and terminating which is characterized by simplicity, ruggedness and ease of operation. The use of the present invention saves times and labor and permits of an accuracy in cutting control unattainable with conventional cable working methods and tools.

While, in the foregoing description, I have discussed certain discrete embodiments of my invention together with possible modifications, numerous other alternative modifications and combinations will undoubtedly suggest themselves to persons skilled in the art after reading this disclosure. Such combinations and modifications may be well within the spirit of the present invention. Accordingly the foregoing description is presented for clearness of understanding only, and no unnecessary limitations should be understood therefrom.

What is claimed is:

1. Apparatus for cutting for removal and beveling cable covering materials which apparatus comprises, in combination;
   (A) At least two roller journals each having at least two rollers arranged to rotate and revolve circumferentially on the cable's peripheral surface as their respective journal is revolved about the longitudinal axis of the cable;
   (B) A first blade assembly on one of said roller journals having a beveling blade arranged and disposed to cut the cable covering material in a manner to define a generally conical surface thereon when the journal on which said first blade assembly is mounted is revolved about the longitudinal axis of the cable;
   (C) A second blade assembly on one of said roller journals having a cutting blade selectably moveable to and through a multiplicity of positions including and from a first position in which said cutting blade is disposed to circumferentially slit the cable covering material when the journal on which said second blade assembly is mounted is revolved about the longitudinal axis of the cable to and including a second position in which said cutting blade is disposed to longitudinally slit the cable covering material when the journal on which said second blade assembly is mounted is moved longitudinally along the cable and
   (D) A flexible strap member connecting said roller journals in a circumferential array around the cable with all rollers in contact with the cable outer covering surface.

2. Apparatus for removing and beveling cable covering materials which apparatus comprises, in combination;
   (A) At least two roller journals each having at least two rollers arranged to rotate and revolve circumferentially on the cable's peripheral surface as their respective journal is revolved about the longitudinal axis of the cable;
   (B) A first blade assembly on one of said roller journals having a beveling blade arranged and disposed to cut the cable covering material in a manner to define a generally conical surface thereon when the journal on which said first blade assembly is mounted is revolved about the longitudinal axis of the cable;
   (C) A second blade assembly on one of said roller journals having a cutting blade selectably moveable to and through a multiplicity of positions including and from a first position in which said cutting blade is disposed to circumferentially slit the cable covering material when the journal on which said second blade assembly is mounted is revolved about the longitudinal axis of the cable to and including a second position in which said cutting blade is disposed to longitudinally slit the cable covering material when the journal on which said second blade assembly is mounted is moved longitudinally along the cable and
   (D) A frame member connecting said roller journals in a circumferential array around the cable with all rollers in contact with the cable outer covering surface.

3. Apparatus for cutting for removal and beveling cable covering materials which apparatus comprises, in combination;
   (A) At least two roller journals each having at least two rollers arranged to rotate and revolve circumferentially on the cable's peripheral surface as their respective journal is revolved about the longitudinal axis of the cable;
   (B) A first blade assembly on one of said roller journals having a beveling blade arranged and disposed to cut the cable covering material in a manner to define a generally conical surface thereon when the journal on which said first blade assembly is mounted is revolved about the longitudinal axis of the cable;
   (C) A second blade assembly on one of said roller journals having a cutting blade selectably moveable to a first position in which said cutting blade is disposed to circumferentially cut the cable covering material when the journal on which said second blade assembly is mounted is revolved about the longitudinal axis of the cable and to a second position in which said cutting blade is disposed to longitudinally slit the cable covering material when the journal on which said second blade assembly is mounted is moved longitudinally along the cable;
   (D) A flexible strap member connecting said roller journals in a circumferential array around the cable with all rollers in contact with the cable outer covering surface.

4. Apparatus for cutting for removal and beveling cable covering materials which apparatus comprises, in combination;
   (A) At least two roller journals each having at least two rollers arranged to rotate and revolve circumferentially on the cable's peripheral surface as their respective journal is revolved about the longitudinal axis of the cable;
   (B) A first blade assembly on one of said roller journals having a beveling blade arranged and disposed to cut the cable covering material in a manner to define a generally conical surface thereon when the journal on which said first blade assembly is mounted is revolved about the longitudinal axis of the cable;
   (C) A second blade assembly on one of said roller journals having a cutting blade arranged and disposed at an angle to spirally cut the cable covering material when the journal on which said second blade assembly is mounted is revolved about the longitudinal axis of the cable and simultaneously moved longitudinally along the cable and (D) A flexible strap member connecting said roller journals in a circumferential array around the cable with all rollers in contact with the cable outer covering surface.

5. Apparatus for cutting for removal and beveling cable covering materials which apparatus comprises, in combination;

(A) At least two roller journals each having at least two rollers arranged to rotate and revolve circumferentially on the cable's peripheral surface as their respective journal is revolved about the longitudinal axis of the cable;

(B) A first blade assembly on one of said roller journals having a beveling blade arranged and disposed to cut the cable covering material in a manner to define a generally conical surface thereon when the journal on which said first blade assembly is mounted is revolved about the longitudinal axis of the cable;

(C) A second blade assembly on one of said roller journals having a cutting blade selectably moveable to and through a multiplicity of positions including and from a first position in which said cutting blade is disposed to circumferentially slit the cable covering material when the journal on which said second blade assembly is mounted is revolved about the longitudinal axis of the cable to and including a second position in which said cutting blade is disposed to longitudinally slit the cable covering material when the journal on which said second blade assembly is mounted is moved longitudinally along the cable and (D) A member connecting said roller journals in a circumferential array around the cable with all rollers in contact with the cable outer covering surface.

6. Apparatus for cutting for removal and beveling cable covering materials which apparatus comprises, in combination;

(A) At least two roller journals each having at least two rollers arranged to rotate and revolve circumferentially on the cable's peripheral surface as their respective journal is revolved about the longitudinal axis of the cable;

(B) A first blade assembly on one of said roller journals having a beveling blade arranged and disposed to cut the cable covering material in a manner to define a generally conical surface thereon when the journal on which said first blade assembly is mounted is revolved about the longitudinal axis of the cable;

(C) A second blade assembly on one of said roller journals having a cutting blade arranged and disposed at an angle to spirally cut the cable covering material when the journal on which said second blade assembly is mounted is revolved about the longitudinal axis of the cable and simultaneously moved longitudinally along the cable and (D) A member connecting said roller journals in a circumferential array around the cable with all rollers in contact with the cable outer covering surface.

References Cited by the Examiner
UNITED STATES PATENTS

| | | | |
|---|---|---|---|
| 2,288,670 | 7/1942 | Babiary. | |
| 2,388,698 | 11/1945 | Montgomery. | |
| 2,697,875 | 12/1954 | McIver | 30—101 X |
| 2,825,967 | 3/1958 | Wheeler | 30—101 X |
| 3,089,237 | 5/1963 | Norton. | |

WILLIAM FELDMAN, *Primary Examiner.*

MYRON C. KRUSE, *Examiner.*